United States Patent
Yamanouchi et al.

(10) Patent No.: US 11,505,039 B2
(45) Date of Patent: Nov. 22, 2022

(54) VEHICLE

(71) Applicant: Toyota Jidosha Kabushiki Kaisha, Toyota (JP)

(72) Inventors: Yuchi Yamanouchi, Toyota (JP); Masaki Shitara, Nagakute (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 16/907,879

(22) Filed: Jun. 22, 2020

(65) Prior Publication Data

US 2020/0406725 A1    Dec. 31, 2020

(30) Foreign Application Priority Data

Jun. 28, 2019   (JP) .............................. JP2019-121595

(51) Int. Cl.
*B60J 1/06*   (2006.01)

(52) U.S. Cl.
CPC ....................... *B60J 1/06* (2013.01)

(58) Field of Classification Search
CPC ......... B60J 1/06; B60J 1/02; B60J 1/18; B60J 9/02; B60J 5/108
USPC ... 296/201, 1.04, 190.1, 146.1, 96.21, 96.22
See application file for complete search history.

(56) References Cited

U.S. PATENT DOCUMENTS

| | | | | |
|---|---|---|---|---|
| 3,427,770 A | * | 2/1969 | Kunert | B32B 17/10293 52/203 |
| 4,773,695 A | * | 9/1988 | Jones | B60J 1/06 29/469 |
| 5,679,417 A | * | 10/1997 | Menegazzo | B32B 17/10293 428/34 |
| 6,902,220 B2 | * | 6/2005 | Moskos | B62D 25/06 296/102 |
| 7,390,051 B2 | * | 6/2008 | Bruntz | B60J 1/06 296/87 |
| 11,267,515 B2 | * | 3/2022 | Shitara | B60R 11/04 |

FOREIGN PATENT DOCUMENTS

| | | | | |
|---|---|---|---|---|
| DE | 2615522 A1 | * | 10/1977 | ............. B60J 5/101 |
| EP | 1270295 A1 | * | 1/2003 | ........... B60J 1/1884 |
| JP | S58-164914 U | | 11/1983 | |
| JP | S60-25516 U | | 2/1985 | |
| JP | S63-242712 A | | 10/1988 | |
| JP | S63242712 A | * | 10/1988 | ............... B60J 1/02 |
| JP | H05-112123 A | | 5/1993 | |
| JP | H11-11241 A | | 1/1999 | |
| JP | 2005053315 A | * | 3/2005 | ............. B60J 5/101 |
| JP | 2017-214059 A | | 12/2017 | |

\* cited by examiner

*Primary Examiner* — Jason S Morrow
*Assistant Examiner* — Wenwei Zhuo
(74) *Attorney, Agent, or Firm* — Dinsmore & Shohl LLP

(57) ABSTRACT

A division bar that divides a front or rear windshield into an upper windshield and a lower windshield is provided, and the upper windshield is more fragile than the lower windshield.

11 Claims, 2 Drawing Sheets

VEHICLE

CROSS REFERENCE TO RELATED APPLICATION

This application claims priority to Japanese Patent Application No. 2019-121595 filed on Jun. 28, 2019, which is incorporated herein by reference in its entirety including the specification, claims, drawings, and abstract.

TECHNICAL FIELD

The present disclosure relates to a vehicle having a front windshield or a rear windshield divided into upper and lower portions.

BACKGROUND

JP 2017-214059 A discloses a front windshield having a laminated glass structure in which a resin interlayer film is bonded between an outer glass plate and an inner glass plate.

SUMMARY

Because the resin interlayer film is bonded between the outer glass plate and the inner glass plate in the front windshield described in JP 2017-214059 A, should an object collide with the windshield, fragments of broken glass will not scatter, the impact is absorbed by the interlayer film, and the colliding object cannot easily pass through the windshield. However, such a structure that makes penetration completely through the windshield difficult may make it difficult for a person to escape from the vehicle should the vehicle rolls over and the doors on the side of the vehicle are blocked.

It is therefore an object of the present disclosure to provide a vehicle that allows a person to escape from the vehicle when the vehicle rolls over, and a door provided on a side of the vehicle be blocked.

A vehicle according to the present disclosure includes a partition member that divides a front or rear windshield into an upper windshield and a lower windshield, with the fragility of the upper windshield differing from the fragility of the lower windshield.

Since either one of the upper windshield and the lower windshield divided by the partition member is fragile, when the vehicle rolls over, and a doorway provided on a side of the vehicle is blocked accordingly, a person can escape from the vehicle by breaking the fragile windshield.

According to an aspect of the vehicle of the present disclosure, the upper windshield may be more fragile than the lower windshield.

According to this aspect, when the vehicle rolls over, and the door provided on the side of the vehicle is blocked, a person can escape from the vehicle by breaking the upper windshield.

According an aspect of the vehicle of the present disclosure, the upper windshield may be sufficiently fragile as to be breakable by human effort and have a width in an upward and downward direction larger than the diameter of a human head.

According to this aspect, when the vehicle rolls over, and the doorway provided on the side of the vehicle is blocked, a person can escape from the vehicle by breaking the upper windshield using unassisted strength.

According to an aspect of the vehicle of the present disclosure, the upper windshield may be made of glass, and the lower windshield may be made of polycarbonate or have a laminated glass structure.

According to this aspect, the lower windshield is made of polycarbonate or has a laminated glass structure to make an object hard to pass through the lower windshield, and the upper windshield is made of glass to allow a person to escape from the vehicle by breaking the upper windshield.

According to an aspect of the vehicle of the present disclosure, the vehicle may have a door provided only on one side of the vehicle.

According to this aspect, a person can escape from the vehicle by breaking the upper windshield even when the vehicle rolls over such that the side on which the door is provided faces downward.

According to an aspect of the vehicle of the present disclosure, the upper windshield is higher in light transmittance than the lower windshield.

According to this aspect, because the upper windshield is higher in light transmittance than the lower windshield, light can enter the vehicle from above, which enables increasing a sense of spaciousness for occupants of the vehicle.

According to the present disclosure, it is possible to provide a vehicle that allows a person to escape when the vehicle rolls over in such a manner that the doorway provided on the side of the vehicle is blocked.

BRIEF DESCRIPTION OF DRAWINGS

Embodiments of the present disclosure will be described based on the following figures, wherein.

DESCRIPTION OF EMBODIMENTS

A vehicle 10 according to an embodiment will be described below with reference to the figures. An arrow FR, an arrow UP, and an arrow RH shown in each of the figures to be described below indicate a forward direction (travel direction), an upward direction, and a rightward direction of the vehicle, respectively. Further, a direction opposite to the arrow FR, a direction opposite to the arrow UP, and a direction opposite to the arrow RH indicate a rearward direction, a downward direction, and a leftward direction of the vehicle, respectively. Hereinafter, when a description is given simply using a frontward and rearward direction, a leftward and rightward direction, or an upward and downward direction, unless otherwise specified, the frontward and rearward direction, the leftward and rightward direction, and the upward and downward direction indicate front and rear in the frontward and rearward direction of the vehicle, left and right in the leftward and rightward direction of the vehicle (vehicle width direction), and top and bottom in the upward and downward direction of the vehicle, respectively.

Figure 1:
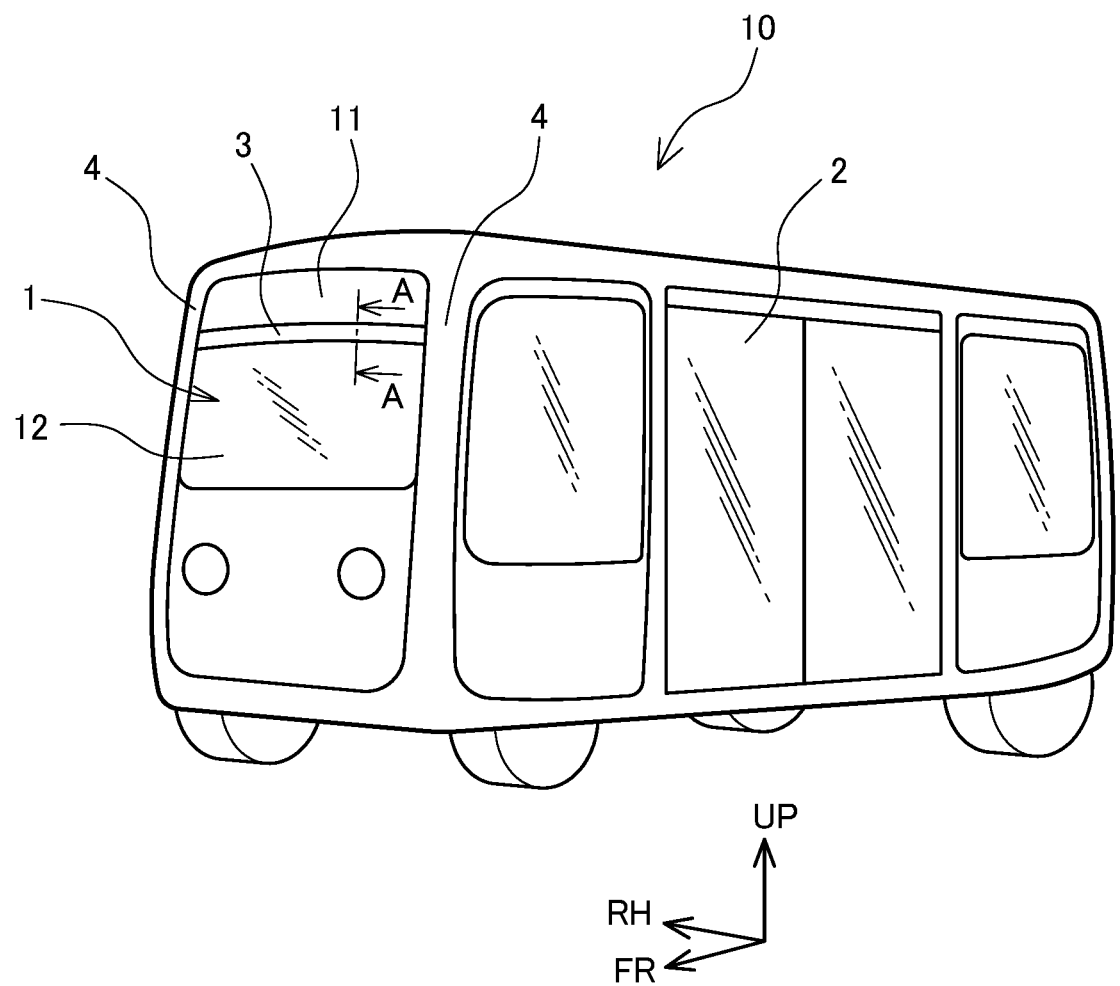
FIG. 1 is a perspective view of a vehicle according to an embodiment of the present disclosure.

As shown in FIG. 1, the vehicle 10 has a windshield 1 provided at a front of the vehicle 10 and has a door 2 for a person to enter or exit the vehicle 10 provided only on a left side of the vehicle 10. The vehicle 10 includes a division bar 3 as a partition member that divides the windshield 1 into an upper windshield 11 and a lower windshield 12.

Figure 2:
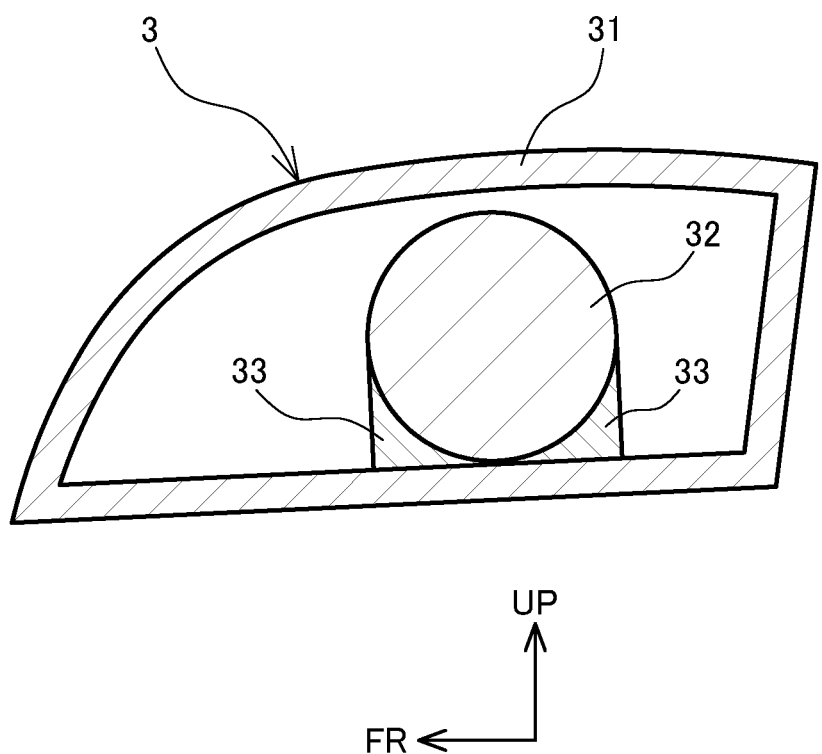
FIG. 2 is a cross-sectional view taken along line A-A of FIG. 1.

FIG. 2 is a cross-sectional view of the division bar 3. As shown in FIG. 2, a reinforcement 32 extending in the vehicle width direction is provided inside a main body 31 of the division bar 3 and is fixed to the main body 31 by a fixing portion 33. Left and right ends of the reinforcement 32 are both connected to a skeletal structure of a front pillar 4. Providing the reinforcement 32 connected to the skeletal structure of the front pillar 4 as described above makes it possible to maintain strength of the division bar 3 enough and increase rigidity of a front side of the vehicle 10.

The lower windshield 12 is made of polycarbonate and has enough strength so as to prevent a flying object such as a stone from breaking or passing through the lower windshield 12 when the flying object collides with the lower windshield 12. Therefore, even when the vehicle 10 rolls over, and the door 2 is blocked accordingly, it is difficult to break the lower windshield 12 to make a hole large enough for a person to pass through.

The lower windshield 12 may have, instead of the structure made of polycarbonate, a laminated glass structure in which a resin interlayer film is bonded between an outer glass plate and an inner glass plate. Even when an object such as a stone collides with the lower windshield 12 having the laminated glass structure, fragments of broken glass are not scattered, the impact is absorbed by the interlayer film, and the colliding object is hard to pass through the windshield. Therefore, should the vehicle 10 roll over in such a manner that the door 2 is blocked accordingly, it is difficult to make a hole in the lower windshield 12 large enough for a person to pass through.

The upper windshield 11 is made of glass and is sufficiently fragile as to be breakable by human power. That is, the upper windshield 11 is more fragile than the lower windshield 12. A width in the upward and downward direction of the upper windshield 11 is larger than a diameter of a human head. Therefore, even when the vehicle 10 rolls over with the left side facing downward in such a manner that the door 2 is blocked accordingly, a person can escape from the vehicle 10 by breaking the upper windshield 11 with their own power.

As described above, in the vehicle 10 according to the present embodiment, the windshield 1 is divided into upper and lower portions by the division bar 3, the lower windshield 12 is made of polycarbonate or has a laminated glass structure to make an object hard to pass through the lower windshield 12, and the upper windshield 11 is made of glass to allow a person to escape from the vehicle by breaking the upper windshield 11.

Should the vehicle 10 rolls over, the possibility that the front or rear side faces downward is very small as compared to the possibility that the vehicle 10 rolls over with the left or right side facing downward, or the possibility that the vehicle 10 is inverted with the top side facing downward. Therefore, in order to allow a person to escape from the front side of the vehicle 10 even when the left or right side is blocked or the top side is blocked, the vehicle 10 has the upper windshield 11 made of glass that can be broken by human power.

The upper windshield 11 is higher in light transmittance than the lower windshield 12. This allows light to enter the vehicle 10 from above the vehicle 10, thus making it possible to increase a sense of spaciousness for occupants of the vehicle.

The vehicle of the present disclosure is not limited to the above-described embodiment and may be implemented according to various embodiments within the scope of the present disclosure. For example, the division bar may be provided on the rear windshield, and the rear windshield may be divided into an upper windshield and a lower windshield.

The invention claimed is:

1. A vehicle comprising
   a door;
   a front or a rear windshield positioned between a pair of pillars; and
   a partition member that divides the front or rear windshield into an upper windshield and a lower windshield, wherein:
   a size of the upper windshield is smaller than a size of the lower windshield;
   a fragility of the upper windshield is different from a fragility of the lower windshield; and
   the partition member includes a main body and a reinforcement connected to the main body by a fixing portion, each of a pair of ends of the reinforcement are connected to a respective one of the pair of pillars.

2. The vehicle according to claim 1, wherein the upper windshield is more fragile than the lower windshield.

3. The vehicle according to claim 2, wherein the upper windshield is made of glass, and the lower windshield is made of polycarbonate.

4. The vehicle according to claim 2, wherein the upper windshield is made of glass, and the lower windshield is made of a laminated glass structure.

5. The vehicle according to claim 2, wherein the door is provided only on one side of the vehicle.

6. The vehicle according to claim 3, wherein the door is provided only on one side of the vehicle.

7. The vehicle according to claim 1, wherein the upper windshield is higher in light transmittance than the lower windshield.

8. The vehicle according to claim 2, wherein the upper windshield is higher in light transmittance than the lower windshield.

9. The vehicle according to claim 3, wherein the upper windshield is higher in light transmittance than the lower windshield.

10. The vehicle according to claim 5, wherein the upper windshield is higher in light transmittance than the lower windshield.

11. The vehicle according to claim 6, wherein the upper windshield is higher in light transmittance than the lower windshield.

* * * * *